United States Patent [19]
Sato

[11] 3,740,137
[45] June 19, 1973

[54] PHOTOCOPYING APPARATUS
[75] Inventor: Jiro Sato, Kawasaki, Japan
[73] Assignee: Canon Kabushiki Kaisha, Tokyo, Japan
[22] Filed: Mar. 2, 1972
[21] Appl. No.: 231,178

[30] Foreign Application Priority Data
Mar. 9, 1971 Japan.............................. 46/12578

[52] U.S. Cl..................................... 355/66, 355/8
[51] Int. Cl. ......................................... G03b 27/70
[58] Field of Search ...................... 355/8, 47, 65, 66

[56] References Cited
UNITED STATES PATENTS
3,523,723  8/1970  Lancor.............................. 355/66 X Primary Examiner—John M. Horan
Attorney—Joseph M. Fitzpatrick, John Thomas Cella, Charles B. Cannon et al.

[57] ABSTRACT

A copying apparatus comprises an original supporting table provided on top of a housing. A first mirror is disposed with respect to an original placed on the supporting table. A second and a third mirror and a lens are provided for directing the original image reflected from the first mirror to a moving photosensitive medium. The second mirror is movable with the first mirror as the latter is moved parallel to the surface of the original to scan such surface while at least three mirrors including the first and second mirrors are rotated about their own axes with the optical paths between their respective points of reflection being maintained at predetermined lengths by a linkage. Thus, the original image may be projected for copying on the moving photosensitive medium through the lens.

4 Claims, 7 Drawing Figures

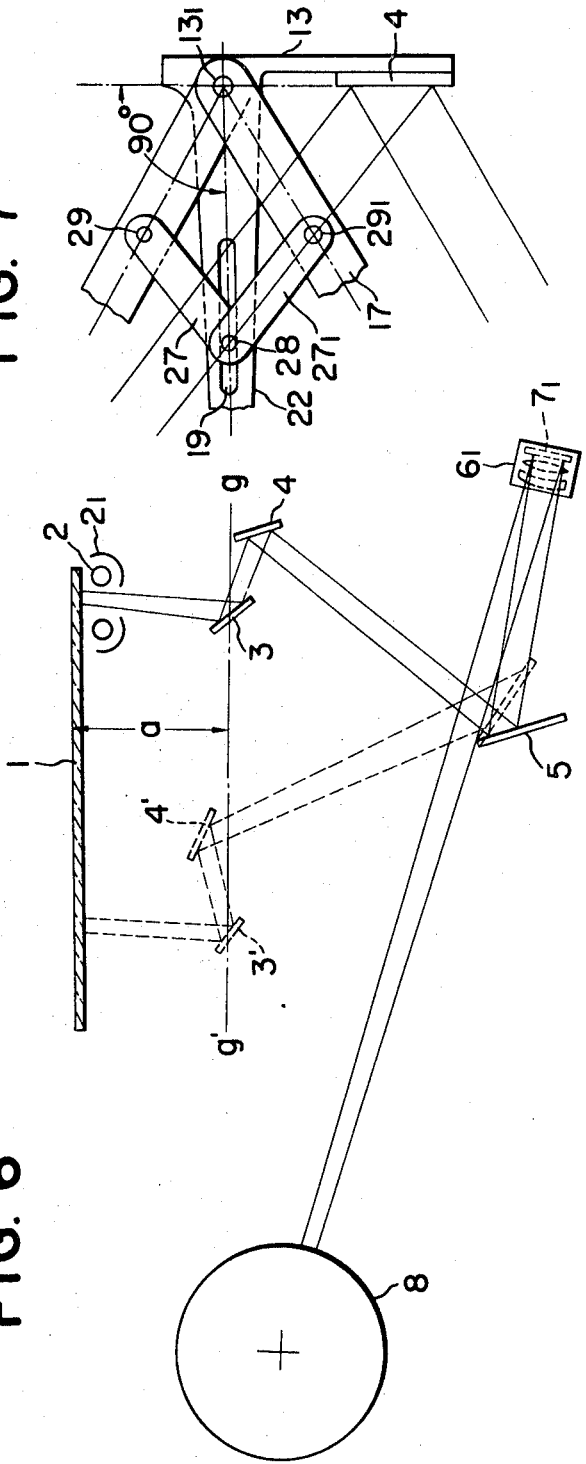

PHOTOCOPYING APPARATUS

BACKGROUND OF THE INVENTION

1. Field of the Invention

This invention relates to a copying apparatus of the type in which an original to be copied remains stationary, and more particularly to a copying apparatus of the type which utilizes an optical image transmission system including an optical lens and mirrors to scan a stationary surface to be copied and project the image thereof on a photosensitive medium mounted for a predetermined movement.

2. Description of the Prior Art

The known copying apparatuses are of the type in which an original to be copied is maintained stationary while the image thereof is scanned and projected through a slit onto a photosensitive medium moving synchronously with the scanning, or of the type in which a lens is interposed between an original and a photosensitive medium and illuminating means and slit means are moved together along the original while the lens is moved at one half of the velocity of the slit means. Also known is the type which utilizes an optical system including first to third mirrors and a lens, of which the first mirror is moved relative to an original while the second and third mirrors are moved together at one half of the velocity of the first mirror.

All these known types of copying apparatus require a high precision with which the optical path of the optical system maintains a predetermined length, and encounter difficulties in attaining a synchronization between the elements of the optical system which are driven at different velocities. In addition, the wide travel range of the optical system does inevitably make the apparatus larger in size.

SUMMARY OF THE INVENTION

It is an object of the present invention to overcome the above-noted disadvantages and provide a novel copying apparatus in which the optical path of its optical system is always maintained at a predetermined length with a high precision and the elements of the optical system may be driven quite easily.

According to the present invention, first mirror means provided with illuminating means is moved along the surface of an original to scan such surface and, in accordance with the movement of the first mirror means, the other elements of the optical system are controlled by a linkage to thereby direct the image light from the original to a photosensitive medium with high accuracy and great ease.

The present invention comprises first mirror means faceing an original (or an object to be copied) placed on a flat surface, and a plurality of mirrors for directing the reflected image of the original through a lens to the photosensitive medium. As the first mirror is moved in parallel relationship to the surface of the original to scan such surface, the second mirror is moved together with the first mirror while at least three mirrors including the first and second mirrors are rotated about their own axes with the optical paths between their respective points of reflection being maintained at predetermined lengths, whereby the original image is projected for copying on a moveing photosensitive medium through the lens.

More specifically, the optical system of the copying apparatus comprises a movable member adapted to receprocate below and in parallel relationship to the original on an original supporting table. First mirror means is journalled to the movable member in such a manner that the point of reflection B of the first mirror means is located at a predetermined vertical distance $a$ from the original. All mirrors are connected together at their pivot axes by means of successive links in such a relationship that the distance $b$ between the point of reflection B of the first mirror and the point of reflection C of the second mirror and the distance $c$ between the point of reflection C of the second mirror and the point of reflection D of the third mirror are invariable. The pivot axis of the third mirror is journalled to fixed members of the apparatus housing. Each mirror is provided with an angle bisecting mechanism for ensuring the mirror to be always perpendicular to a line bisecting the sum of the angles of incidence and reflection on the mirror.

BRIEF DESCRIPTION OF THE DRAWINGS:

The invention will be described in detail by way of example with reference to the accompanying drawings, in which:

FIGS. 5 and 6 schematically illustrate modified optical arrangements; and

FIG. 7 is a fragmentary front view of the angle bisecting mechanism constituting the FIG. 6 arrangement.

Figure 1:
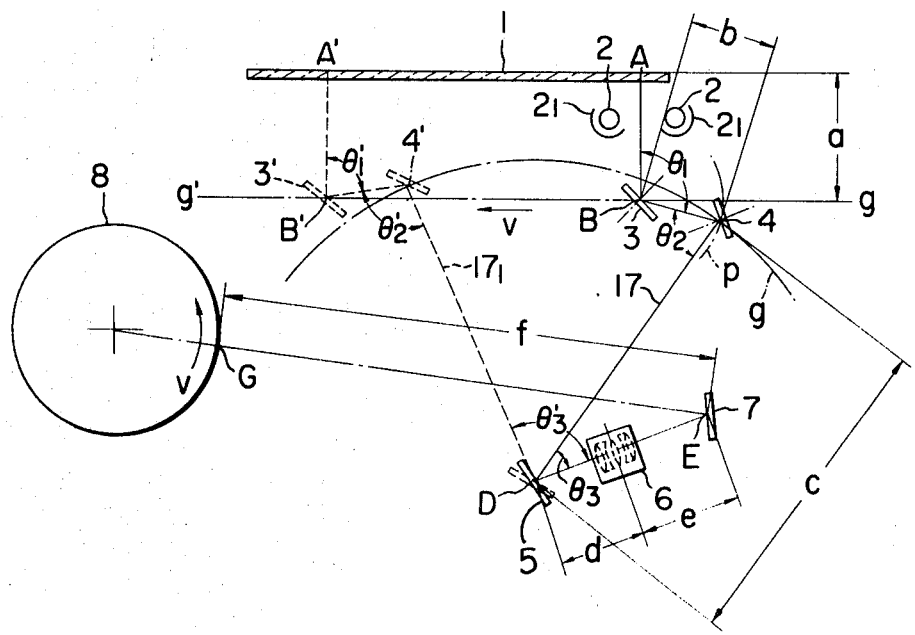
FIG. 1 is a schematic view illustrating the optical arrangement in the copying apparatus according to an embodiment of the present invention.

DESCRIPTION OF THE PREFERRED EMBODIMENTS:

Referring to FIG. 1, there is shown an optical arrangement which includes a transparent original supporting table 1 formed of glass, acryl or like material on which an original or object to be copied may be placed and maintained in position by suitable holding and shielding plate of rubber or similar material (not shown). Illuminating means such as a pair of movable light sources 2 provided with reflectors $2_1$ is disposed below the original supporting table 1 to illuminate an original placed thereon. A first mirror 3 is disposed in opposed relationship with the original so illuminated. A second mirror 4 and a third mirror 5 are disposed so as to direct the reflected image of the original from the first mirror 3 to a lens 6. A fourth mirror 7 is fixedly mounted so as to direct the image from the lens 6 to a point of projection G on a rotatable photosensitive medium 8, which may be in the form of a drum as shown, or of a sheet or a belt.

The first mirror 3 is reciprocatingly movable with the light sources 2 in such a manner that its point of reflection B shifts along a line g–g' parallel to the table 1 and over a distance between points A and A'. During one of the reciprocal strokes, the light sources 2 are turned on to scan the original on the table 1 and project the image thereof on the photosensitive medium 8 at the point G. It is ensured that the image on the optical axis A–B or A'–B' is directed onto the optical axis D–E of the lens 6, irrespective of the variable scanning position. For this purpose, the lengths of the optical paths between members 1 and 3, 3 and 4, 4 and 5, 5 and 6, 6 and 7, and 7 and 8, namely, the lengths designated by $a$, $b$, $c$, $d$, $e$, and $f$, must satisfy the relation that $a + b + c + d = e + f$ (where the magnification of copy is selected at 1). Also, the mirrors 3 to 5, which are rotatable about their own axes, must be rotated about their respective points of reflection B, C and D, respectively, in such a manner that their planes of reflection remain perpendicular to the lines bisecting the angles $\Theta_1$, $\Theta_1'$, $\Theta_2$, $\Theta_2'$, $\Theta_3$ and $\Theta_3'$, which are respectively the sums of the angles of incidence and reflection at the points of reflection B, C and D. To satisfy these two conditions on the lengths of the various optical paths and the angles of rotation, the second mirror 4 should be such that its point of reflection C lies at the point of intersection between the arc $p$ whose radius equals the length of the optical path $b$ from the first mirror 3 and the arc $q$ whose radius equals the length of the optical path $c$ from the third mirror 5.

With all these conditions satisfied, it is ensured that the lengths of the optical paths are maintained invariable when the surface of the original to be copied is scanned by the first mirror 3, whereby the image of the original as scanned is properly directed onto the optical axis D–E of the lens 6.

Figure 2:
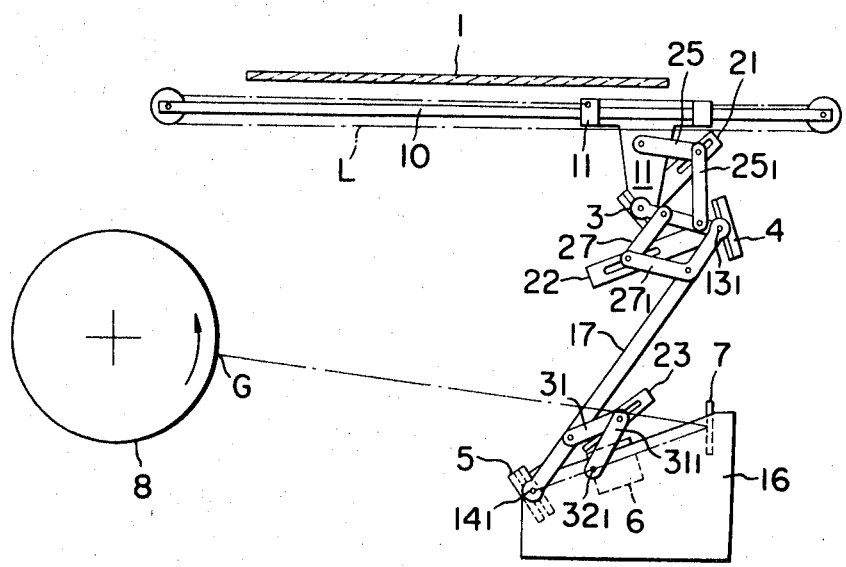
FIG. 2 is a schematic view illustrating the mechanism of such optical arrangement.
Figure 3:
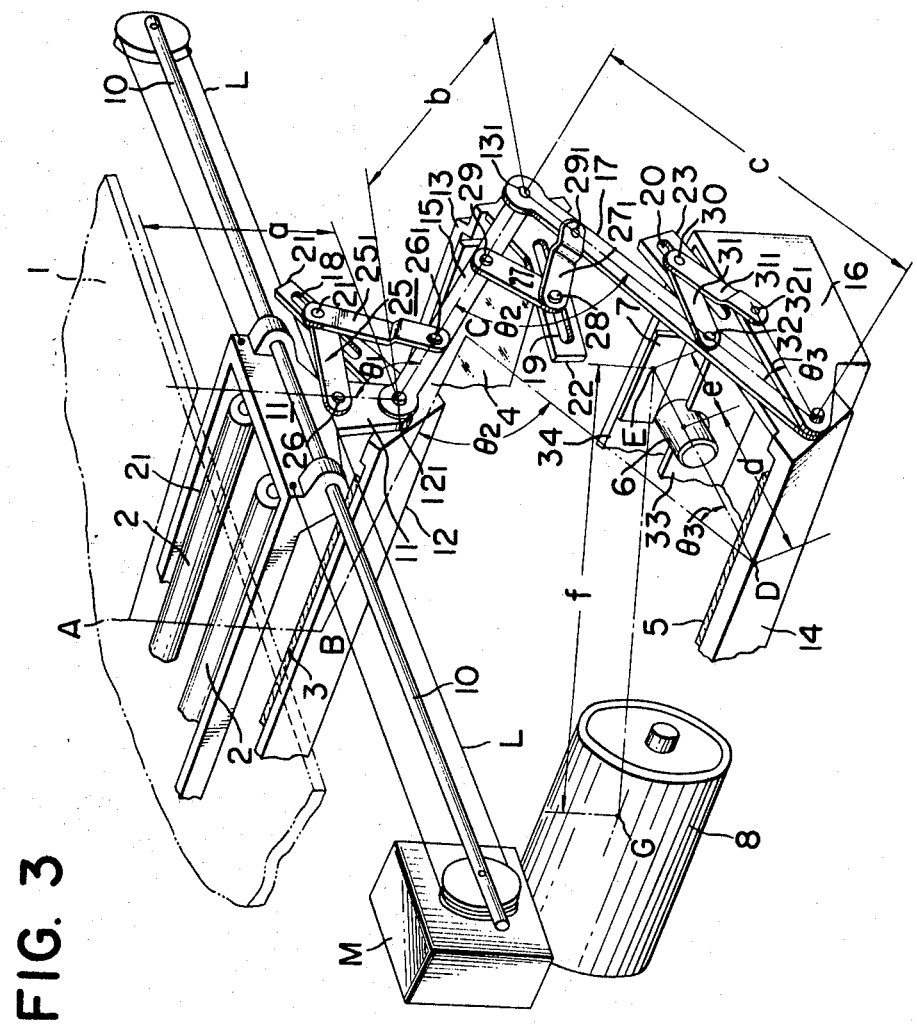
FIG. 3 is a fragmentary perspective view of the same mechanism.
Figure 4:
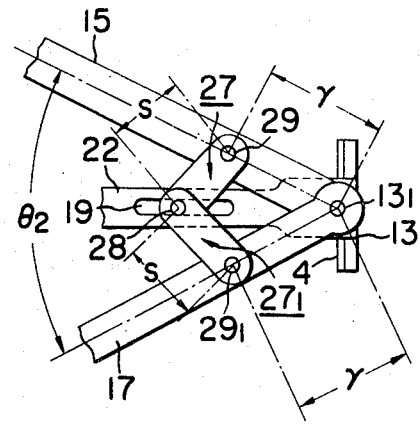
FIG. 4 is a fragmentary front view of the angle bisecting mechanism constituting a part of the FIG. 1 arrangement.

Description will now be made of the manner in which the above-described optical arrangement is formed into an apparatus. As shown in FIGS. 2 and 3, a pair of forward and rearward rails 10 is disposed below the glass table 1 in parallel relationship therewith and mounted to an unshown machine housing, and a movable member 11 is mounted for reciprocal movement on the rails 10 with the aid of the drive from a motor M via a rope L. The movable member 11 is made to carry thereon the pair of light sources or lamps 2 provided with respective reflectors $2_1$, in such a manner that the lamps and reflectors are in underlying and orthogonally transverse relationship with the table 1. A holder frame 12 for the first mirror 3 is attached to the movable member 11 at the vertically extending arm $11_1$ thereof by menas of pin $12_1$ in such a manner that the point of reflection B of the first mirror 3 lies at a vertical distance $a$ from the surface to be copied, and the first mirror 3 is attached to the frame 12 so as to extend below and transversely of the original supporting table 1. A holder frame 13 for the second mirror 4 has its pivot pin $13_1$ connected to a link 15, which is connected at the other end to the pin $12_1$ of the holder frame 12, in such a manner that the distance between the two pins $12_1$ and $13_1$ is equal to the length of the optical path $b$. Similarly, a holder frame 14 for the third mirror 5 has its pivot pin $14_1$ connected to a link 17, which is connected at the other end to the pin $13_1$ of the holder frame 13, in such a manner that the distance between the two pins $13_1$ and $14_1$ is equal to the length of the optical path $c$ extending between the points of reflection C and D of the mirrors 4 and 5. Further, the pin $14_1$ is journalled to a lens support member 16 fixed to the machine housing.

Guide rods 21, 22 and 23, provided with slots 18, 19 and 20, respectively, are formed integrally with the respective mirror holder frames 12, 13 and 14, the slots 18, 19 and 20 being oriented perpendicularly to the surfaces of the mirrors 3, 4 and 5 held by those frames. The slot 18 in the guide rod 21 receives therein a pin 24, which pivotally mounts links 25 and $25_1$ of equal length at one end thereof. The other ends of the links 25 and $25_1$ are pivotally connected to the movable member 11 and link 15 by means of pins 26 and $26_1$ located equidistantly from the pin $12_1$ which mounts the member 11 and link 15. Such arrangement of the angle bisecting mechanism ensures that the longitudinal direction of the slot 18 is always in accord with the line bisecting the angle $\Theta_1$ defined between the vertical arm $11_1$ of the movable member 11 and the link 15, independently of any variation in such angle $\Theta_1$, whereby the mirror 3 always lies in a plane perpendicular to the bisecting line.

The other two mirrors 4 and 5 are also provided with similar angle bisecting mechanisms 27–29 and 30–$32_1$, respectively, in the manner as shown in FIG. 3, to ensure that the reflective surface of each mirror is always perpendicular to the line bisecting the sum of the angles of incidence and reflection at the points B, C or D.

On the axis D–E parallel to the links $14_1$ and $32_1$ of the angle bisecting mechanism for the third mirror 5, the lens 6 and the fourth mirror 7 are fixedly mounted to the support member 16 by means of members 33 and 34, respectively.

In the above-described construction, movement of the movable member 11 at a velocity $v$ in the leftward direction, as viewed in FIG. 1, causes the first and second mirrors 3 and 4 to be moved together, while the link 17 connected to the pivot pin $13_1$ of the second mirror 4 is caused to pivot about the pin $14_1$ from its solid-line position 17 to its phantom-line position $17_1$ as shown in FIG. 1, because the lower end of the link 17 is pivotally mounted to the stationary support member 16 by means of the pin $14_1$, so that the third mirror 5 is maintained perpendicular to the line bisecting the angles $0_3$–$0_3'$, whereby the reflected light from the third mirror always travels along the optical axis of the lens 6.

The movement of the links 26 and $12_1$ and the resultant pivotal movement of the link 17 actuates the angle bisecting mechanisms $12_1$, 26, 24, $26_1$, $13_1$, 29, 28 and $29_1$ so that the mirrors 3, 4 and 5 are pivotally moved in association with one another while maintaining the optical paths therebetween at predetermined lengths, whereby the original image reflected on the first mirror 3 is focused at the point G on the rotating photosensitive medium 8.

Thus, according to the present invention, the mirrors 3 and 4 are supported by the movable member 11 for movement with the latter while the link 17 is pivoted about the pin $14_1$, and this is suitable to realize the light weight and high speed of the movable member. Also, the simple link-to-link connection leads to a greater simplicity of the entire construction and to a greater ease of design with reduced manufacturing errors.

Furthermore, the fact that the pin $14_1$ of the holder for the third mirror 5 is secured to the stationary support member 16 ensures the hold of the linkage of the pivotable second mirror 4, and this is suitable for high-speed copying operations.

Figure 5:
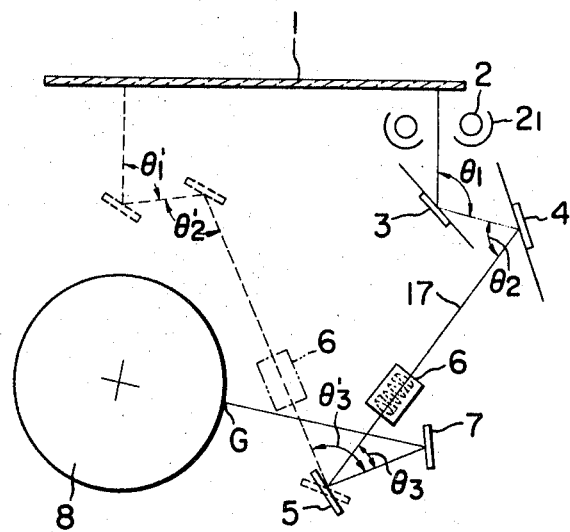

FIG. 5 shows a modified embodiment of the present invention in which the lens 6 is interposed between the second mirror 4 and the third mirror 5 and adapted to be moved with the pivotal movement of the link 17. FIG. 6 illustrates a further embodiment which employs an in-mirror lens $6_1$. The angle bisecting mechanism for the second mirror 4 in the embodiment of FIG. 6 is illustrated in FIG. 7.

I claim:

1. A copying apparatus comprising a housing, a table having a plane surface for supporting an original provided on top of said housing, a first mirror disposed with respect to said original placed on said table, a second and a third mirror and a lens for directing the original image reflected from said first mirror to a moving photosensitive medium, said second mirror being moved with said first mirror as the latter is moved in parallel relationship to the surface of said original to scan such surface while at least three mirrors including said first and second mirrors are rotated about their own axes respectively with the optical paths between their respective points of reflection being maintained at predetermined lengths by a linkage, whereby the original image is projected for copying on said moving photosensitive medium through said lens.

2. A copying apparatus comprising a housing, an original supporting table provided on top of said housing, a movable member adapted to reciprocate below and in parallel relationship to an original placed on said table, first mirror means journalled to said movable member in such a manner that the point of reflection (B) of said first mirror means is located at a predetermined vertical distance from said original, said first mirror means having an angle bisecting mechanism adapted to ensure said first mirror to be always perpendicular to a line bisecting the sum of the angles of incidence and reflection of the original image on said first mirror means, second mirror means having a point of reflection (C) located at a predetermined distance from said point of reflection (B) of said first mirror means, said points of reflection (B,C) being connected together by means of pivot pins, said second mirror means having an angle bisecting mechanism, third mirror means having a point of reflection (D) located at a predetermined distance from said point of reflection (C) of said second mirror means, said points of reflection (C, D) being connected together by means of pivot pins, said third mirror means having an angle bisecting mechanism, said pivot pins at said point of reflection (D) being journalled to stationary members, a lens, and a fourth mirror, whereby the original image is projected for copying on a photosensitive medium.

3. A copying apparatus according to claim 2, wherein said fourth mirror comprise a unitary in-mirror lens.

4. A copying apparatus according to claim 2, wherein each of said angle bisecting mechanisms comprises a guide rod formed with a slot oriented perpendicularly to the reflective surface of the respective mirror, and a set of links having an equal length, one end of each link being connected to a pin received in said slot, the other ends of said links being connected to said pivot pins or said support members at proper locations thereof.

* * * * *